(12) United States Patent
Liu

(10) Patent No.: US 11,877,678 B2
(45) Date of Patent: Jan. 23, 2024

(54) WINE DECANTER

(71) Applicant: Danping Liu, Shenzhen (CN)

(72) Inventor: Danping Liu, Shenzhen (CN)

( * ) Notice: Subject to any disclaimer, the term of this patent is extended or adjusted under 35 U.S.C. 154(b) by 1486 days.

(21) Appl. No.: 16/097,827

(22) PCT Filed: Mar. 13, 2018

(86) PCT No.: PCT/CN2018/078822
§ 371 (c)(1),
(2) Date: Oct. 30, 2018

(87) PCT Pub. No.: WO2019/173964
PCT Pub. Date: Sep. 19, 2019

(65) Prior Publication Data
US 2021/0219783 A1    Jul. 22, 2021

(51) Int. Cl.
| | | |
|---|---|---|
| *A47J 43/00* | (2006.01) | |
| *A47J 43/12* | (2006.01) | |
| *B01F 13/08* | (2006.01) | |
| *A47G 23/02* | (2006.01) | |
| *B01F 33/451* | (2022.01) | |
| *B01F 23/236* | (2022.01) | |
| *B01F 35/71* | (2022.01) | |
| *B01F 101/17* | (2022.01) | |

(52) U.S. Cl.
CPC .......... *A47G 23/0241* (2013.01); *A47J 43/12* (2013.01); *B01F 23/236* (2022.01); *B01F 33/451* (2022.01); *B01F 35/7176* (2022.01); *A47G 2400/045* (2013.01); *A47J 43/00* (2013.01); *B01F 2101/17* (2022.01)

(58) Field of Classification Search
CPC .......... A47G 23/0241; A47G 2400/045; B01F 33/451; B01F 2101/17; B01F 35/7176; B01F 23/236
See application file for complete search history.

(56) References Cited

U.S. PATENT DOCUMENTS

| | | | | |
|---|---|---|---|---|
| 3,164,300 A | * | 1/1965 | Dousette | G01F 15/007 222/332 |
| 4,494,452 A | * | 1/1985 | Barzso | B01F 23/2361 99/323.1 |

(Continued)

FOREIGN PATENT DOCUMENTS

| | | |
|---|---|---|
| CN | 201861431 U | 6/2011 |
| CN | 202375933 U | 8/2012 |

(Continued)

*Primary Examiner* — Frederick C Nicolas
(74) *Attorney, Agent, or Firm* — Cheng-Ju Chiang

(57) ABSTRACT

A wine decanter includes a control circuit board; and a water pump, an air pump, a power supply and a switch electronically connected with the control circuit board respectively. An inlet end of the water pump is connected to one end of a first connecting pipe, an outlet end of the water pump is connected to one end of a second connecting pipe; an outlet end of the air pump is connected to one end of the gas pipe, and the other end of the gas pipe is connected to any position of the liquid flow path which includes the first connecting pipe and the second connecting pipe; the red wine drawn by the water pump is mixed with air injected by the air pump in the liquid flow path for decanting.

15 Claims, 3 Drawing Sheets

(56) References Cited

U.S. PATENT DOCUMENTS

| | | | |
|---|---|---|---|
| 8,561,970 B1 * | 10/2013 | Mills | B01F 23/23121 |
| | | | 99/323.1 |
| 10,512,349 B2 * | 12/2019 | Wu | A47J 47/01 |
| 11,000,813 B2 * | 5/2021 | Giardullo | B01F 23/23411 |
| 2013/0153685 A1 | 6/2013 | Drobot et al. | |

FOREIGN PATENT DOCUMENTS

| | | |
|---|---|---|
| CN | 203290781 U | 11/2013 |
| CN | 203647130 U | 6/2014 |
| CN | 104983310 A | 10/2015 |
| CN | 204765210 U | 11/2015 |
| CN | 205251316 U | 5/2016 |
| CN | 105768951 A | 7/2016 |
| CN | 106073533 A | 11/2016 |
| CN | 106108703 A | 11/2016 |
| CN | 205709831 U | 11/2016 |
| CN | 206507817 U | 9/2017 |
| CN | 206615548 U | 11/2017 |
| CN | 206809189 U | 12/2017 |
| CN | 208625457 U | 3/2019 |
| EP | 2921085 A1 | 9/2015 |
| JP | 3210479 U | 5/2017 |
| WO | 2018/032413 A1 | 2/2018 |

* cited by examiner

WINE DECANTER

CROSS REFERENCE TO RELATED APPLICATIONS

The present application is a 35 U.S.C. § 371 National Phase conversion of International (PCT) Patent Application No. PCT/CN2018/078822, filed on Mar. 13, 2018, the disclosure of which is incorporated by reference herein. The PCT International Patent Application was filed in Chinese.

TECHNICAL FIELD

The present invention relates to auxiliary wine utensils, and especially to a wine decanter.

BACKGROUND

With the improvement of living standards, the consumption demands for red wine are increasing. The wine is astringent if consumed right after opening the wine bottle because the wine contains high tannins. It will take forty minutes to an hour to fully soften tannins and eliminate the astringent taste when the wine contacts with air in the natural environment.

At present, the wine decanters available on the market are too simple, are mostly funnel-shaped glass vessels and usually used to extract red wine from wine bottles into wine glasses. However, the wine in the vessels cannot quickly and fully contact with the air in the process of decanting wine, which results that the decanting process still takes dozens of minutes, thus it is also not practical.

SUMMARY

Technical Problems

In order to solve the problems mentioned above, a wine decanter is provided in the present invention, which can quickly decant wine, improve drinking taste and is easily cleaned.

Technical Solution

In order to solve the problems mentioned above, a wine decanter provided in the present invention comprises a control circuit board; and a water pump, an air pump, a power supply and a switch electronically connected with the control circuit board respectively. An inlet end of the water pump is connected to one end of a first connecting pipe, an outlet end of the water pump is connected to one end of a second connecting pipe; an outlet end of the air pump is connected to one end of the gas pipe, and the other end of the gas pipe is connected to any position of the liquid flow path which comprises the first connecting pipe and the second connecting pipe; when the switch is triggered on, the water pump and the air pump are activated, the red wine drawn by the water pump is mixed with air injected by the air pump in the liquid flow path for decanting before the red wine is poured out.

Further, a gas-liquid mixing chamber is arranged in the liquid flow path; and the gas pipe is connected to the gas-liquid mixing chamber.

Further, the gas-liquid mixing chamber is transparent, a light source is integrated on the control circuit board to produce red light, the light source is disposed corresponding to the gas-liquid mixing chamber; when the switch is triggered on; the light source produces red light to irradiate the gas-liquid mixing chamber to accelerate decanting the red wine flowing through the gas-liquid mixing chamber; a light guide sheet is provided above the light source for uniformly transmitting light.

Further, the liquid flow path is provided with a magnetization mechanism; and the magnetization mechanism generates a magnetic field capable of magnetizing the red wine flowing through the liquid flow path.

Further, the magnetization mechanism comprises more than one ring magnets, and the ring magnets are sleeved and installed to the liquid flow path.

Further, all the first connecting pipe, the second connecting pipe and the gas pipe are flexible pipes; the first connecting pipe and/or the second connecting pipe and/or the gas pipe therein are provided with an elastic support mechanism which can elastically support an entire section of pipe inner wall.

Further, the elastic support mechanism is spring.

Further, a charging circuit board is electronically connected with the control circuit board, and is integrated with a charging interface; and the power supply adopts a rechargeable battery which is electronically connected with the charging circuit board.

Further, the control circuit board is integrated with a power detection circuit, and the power detection circuit is electronically connected with the rechargeable battery; the control circuit board is integrated with a indicator lamp; when the switch is triggered on, the power detection circuit is capable of detecting a remaining electric quantity of the rechargeable battery, and the remaining electric quantity is displayed via the indicator lamp emitting different colors of light.

Further, the wine decanter comprises a housing which is assembled to one integral piece by a first case and a second case being clasped together; the control circuit board, the water pump, the air pump, the power supply, and the charging circuit board are contained in the housing; the switch and the charging interface of the charging circuit board extend out of the housing; the housing forms a liquid discharge port and a liquid intake port; and two ends of the liquid flow path are located at the liquid discharge port and the liquid intake port respectively.

Further, the housing therein defines a tubular accommodation space, and the tubular accommodation space therein contains an accommodation barrel suitable for the tubular accommodation space; the accommodation barrel inside forms a plurality of slots respectively used to insert and fix the gas-liquid mixing chamber, the control circuit board, the water pump, the air pump, the power supply and the charging circuit board; a side wall of the accommodation barrel defines a first groove for both the gas-liquid mixing chamber and the switch protruding through, and the housing corresponding to the first groove defines through holes for both the gas-liquid mixing chamber and the switch to extend out; the side wall of the accommodation barrel further defines a second groove for the charging interface of the charging circuit board protruding through, and the housing corresponding to the second groove is provided with another through hole for the charging interface to extend out.

Further, a cover plate removably installs to a top of the accommodation barrel and a mounting seat removably installs to an opposite bottom of the same; the cover plate defines a notched slot for protruding a third connecting pipe connected with the gas-liquid mixing chamber; the mounting seat comprises a bottom plate with a disc shape, and a circular side wall extending towards both opposite sides from a rim of the bottom plate; two opposite faces of the bottom plate are provided with a first connecting head and a second connecting head respectively, the first connecting head and the second connecting head are hollow and connected to each other; the first connecting pipe of the water pump is inserted and connected to the first connecting head; the second connecting head is used to insert and connect a liquid intake pipe; the bottom plate at one end of the second connecting head, the second connecting head, and the circular side wall constitute a circular insertion seat via which the wine decanter is installed to a mouth of the wine bottle.

Further, a plurality of antiskid stripes evenly extends around an outer wall of the second connecting head and along an axial direction of the second connecting head.

Further, the liquid intake pipe is retractable, and the third connecting pipe inside is provided with an elastic support mechanism to support a pipe wall thereof.

Further, the control circuit board defines more than one via holes; the gas-liquid mixing chamber is provided with two side tubes; the side tubes pass through the via holes and are connected to the second connecting pipe and the gas pipe respectively.

Advantages

The wine decanter of the present invention has the following advantages:

By setting the water pump and the air pump, and connecting the gas pipe of the air pump 4 to the liquid flow path of the water pump, the red wine can be fully mixed with air before being discharged out of the wine decanter, so as to achieve a quick decanting and improve the drinking taste; and it is convenient to clean the wine decanter.

Furthermore, by setting the magnetization mechanism to the liquid flow path, the surface tension of red wine is increased, the red wine is softened, and thus tastes better.

Moreover, by setting a transparent gas-liquid mixing chamber to the liquid flow path, and setting a light source at a corresponding position of the gas-liquid mixing chamber to produce red lights, the red wine in the gas-liquid mixing chamber can be irradiated by the red light of the light source, which can further accelerate decanting and improve the drinking taste.

DETAILED DESCRIPTION

The present invention is described in detail in combination with drawings and embodiments.

Figure 1:
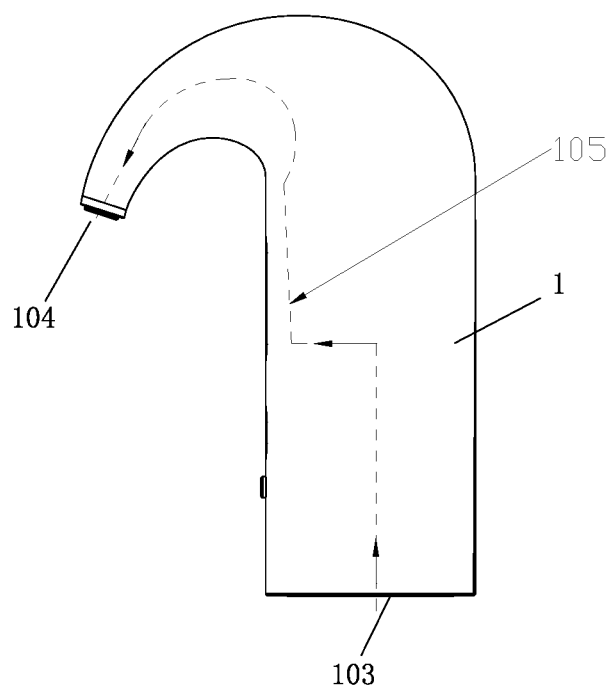
FIG. 1 is a side view showing a wine decanter of the present invention.
Figure 2:
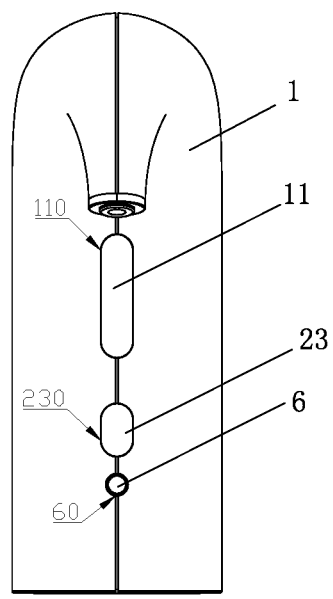
FIG. 2 is a front view showing the wine decanter of the present invention.
Figure 3:
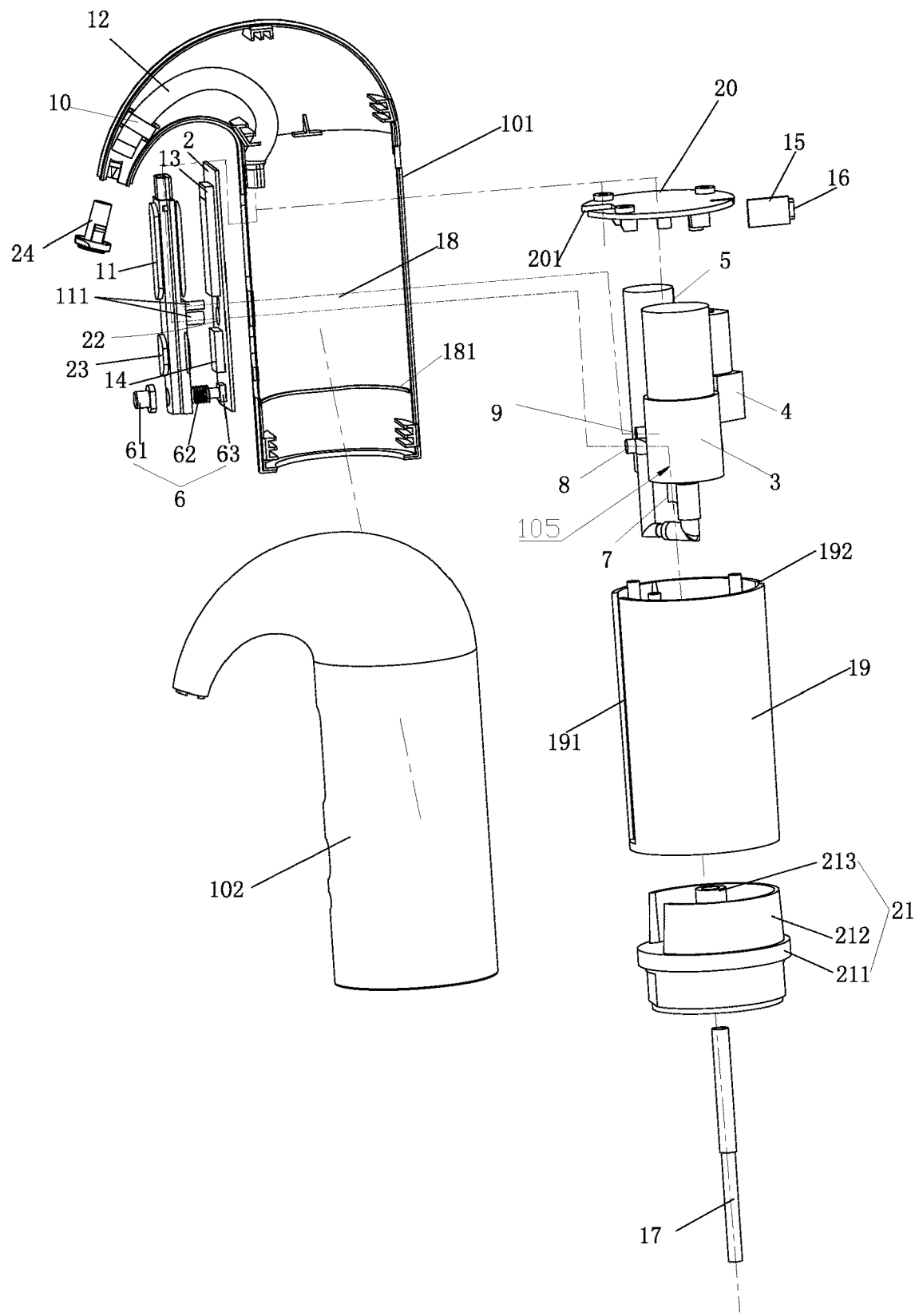
FIG. 3 is an exploded view showing the wine decanter of the present invention.
Figure 4:
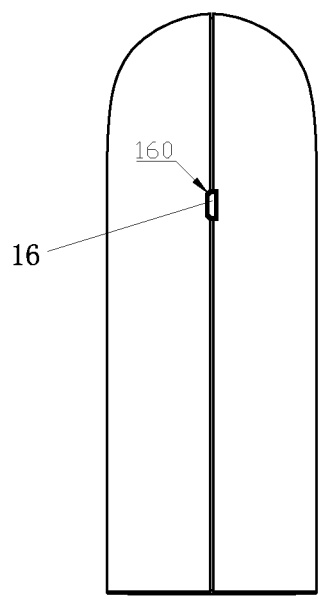
FIG. 4 is a rear view showing the wine decanter of the present invention.
Figure 5:
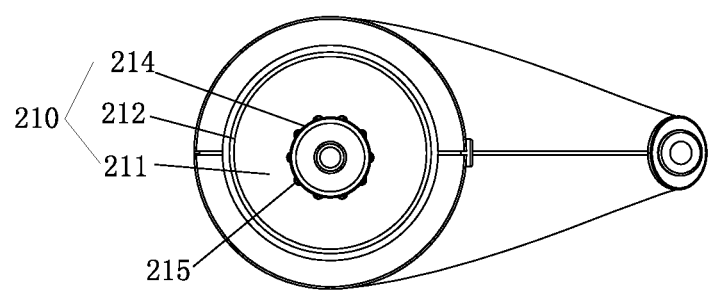
FIG. 5 is a bottom plan view showing the wine decanter of the present invention.

Referring to FIGS. 1-5 together, a wine decanter is provided in the present invention. Referring to FIG. 3 in detail, the wine decanter comprises a control circuit board 2, a water pump 3, an air pump 4, a power supply 5, and a switch 6. The water pump 3, the air pump 4, the power supply 5 and the switch 6 are electronically connected with the control circuit board 2 respectively. An inlet end of the water pump 3 is connected with one end of a first connecting pipe 7, and an outlet end of the water pump 3 is connected with one end of a second connecting pipe 8. An outlet end of the air pump 4 is connected with one end of a gas pipe 9. The other end of the gas pipe 9 is connected to any position of a liquid flow path 105. The liquid flow path 105 comprises the first connecting pipe 7 and the second connecting pipe 8. The gas pipe 9 is connectable to any position of the liquid flow path 105, for example, is connectable to one side of the liquid flow path 105 where is located with the first connecting pipe 7, or is connectable to another side of the liquid flow path 105 where is located with the second connecting pipe 8 (that's the outlet of the red wine).

After the wine decanter is fitted to a mouth of a red wine bottle, once the switch 6 is triggered on, the water pump 3 is activated, thus the red wine is extracted from the red wine bottle through the first connecting pipe 7, and flows out through the second connecting pipe 8 to a wine vessel such as a glass. The air pump 4 can be activated at the same time as the water pump 3 (or the air pump 4 starts before or after the water pump 3 starts according to a presetting). The air pump 4 can inject air via the gas pipe 9 into the liquid flow path, in such way that the red wine can be quickly and fully mixed with air in the liquid flow path, thus can achieve a quick decanting of red wine (equivalent to a decanting for thirty minutes or more in the natural environment), the red wine is then poured out to the glass for drinking. Once the switch 6 is triggered off, both the water pump 3 and the air pump 4 will be closed.

In a preferable embodiment, as shown in FIG. 3, the wine decanter comprises a magnetization mechanism 10. The magnetization mechanism 10 can be arranged at any position of the liquid flow path 105 to magnetize the red wine flowing through it. Preferably, to simplify the structure and reduce costs, the magnetization mechanism 10 comprises more than one ring magnets. The more than one ring magnets are sleeved and installed to the liquid flow path 105, for example, the more than one ring magnets sleeves and is fixed around a third connecting pipe 12. A surface tension of red wine is increased by magnetization, thus the red wine is softened, which makes it taste better.

In a preferable embodiment, to facilitate the connection and installation of pipes, all the pipes including the first connecting pipe 7, the second connecting pipe 8 and the gas pipe 9 can adopt flexible pipes. Preferably, in order to prevent the first connecting pipe 7 and/or the second connecting pipe 8 at a bending section from blocking the red wine, an elastic support mechanism with suitable dimensions (not shown) can be arranged within the first connecting pipe 7 and/or the second connecting pipe 8 to elastically support the entire section of the pipe inner wall, in such way, no effect on an installation bending of the pipes yet no pipe blockage. The elastic support mechanism preferably adopts a spring to support the inner wall of pipes in whole section. Certainly, the gas pipe 9 therein may also be equipped with the elastic support mechanism so as to prevent an air path from being blocked.

In a preferable embodiment, as shown in FIG. 3, the liquid flow path is set with a gas-liquid mixing chamber 11 therein for full mixing of the red wine and air. For example, the gas-liquid mixing chamber 11 is arranged at a distal end of the second connecting pipe 8, the distal end of the gas pipe 9 is connected to the gas-liquid mixing chamber 11, and further, the gas-liquid mixing chamber 11 is connected to one end of the third connecting pipe 12 acting as a wine discharge pipe.

Preferably, the gas-liquid mixing chamber 11 is made of transparent material for transparency, the transparent material includes such as glass material, which is not only convenient for light irradiation, but also convenient for viewing the flow of red wine and the process of decanting. To speed up decanting, a light source (not shown) can be disposed at a corresponding position of the gas-liquid mixing chamber, and the light source can be electrically connected to the control circuit board 2 to produce red light. When the switch 6 is triggered on, the light source can emit red light which quickens decanting the red wine in the gas-liquid mixing chamber 11. The light source is preferably integrated on the control circuit board 2. In order to make the light emit uniformly, a light guide sheet 13 for uniformly transmitting light may be arranged above a surface of the light source.

Further, the light source can use a two-color light source, which can produce red and blue light. A delay circuit is arranged on the control circuit board 2. When the switch 6 is triggered on, red light emits and blue light blacks out; while the switch 6 is triggered off, red light blacks out, and blue light emits and is delayed to black out. When the blue light emits, bubbles (residual air from the air pump 4 before shutdown) in the gas-liquid mixing chamber 11 can be observed obviously.

In the above embodiments, for ease of use, the power supply 5 adopts a rechargeable battery. Accordingly, a charging circuit board 15 is further set in the wine decanter. The charging circuit board 15 is electronically connected with the control circuit board 2, and is integrated with a charging interface 16. The charging interface 16 can adopt those types of charging interface used in common electronic devices such as mobile phones, etc., for example, adopt one or more from USB-micro interface, USB-TYPE C interface, or Lightning interface.

Further, the control circuit board 2 is integrated with a power detection circuit for detecting an electric quantity of the power supply 5, and the power detection circuit is electronically connected with the power supply 5. The control circuit board 2 is also integrated with an indicator lamp (not shown), for example, the indicator lamp can is a combination of three color light sources such as green, yellow and red. In order to make the light emission more uniform, a light guide sheet 14 is arranged on the surface of the indicator lamp. For example, if the power detection circuit detects that the remaining electric quantity of the power supply 5 is above 90%, and then the green light of the indicator lamp emits; if the remaining electric quantity is at a range of 20%~90%, and then the yellow light of the indicator lamp emits; if the remaining electric quantity is below 20%, and then the red light of the indicator lamp emits; in such way that the user can easily know the electric quantity of the wine decanter in time. For example, when the switch 6 is triggered on, the power detection circuit initiates the real-time detection and feeds back the remaining electric quantity of the power supply 5 via the indicator lamp.

The wine decanter further comprises a retractable liquid intake pipe 17, and the liquid intake pipe 17 is capable of insert connection with the first connecting pipe 7, and can be used to insert the wine bottle as an intake pipe. The liquid intake pipe 17 can adjust its length by telescopic means for different depths of red wine bottles or utensils. For example, the liquid intake pipe 17 is made of stainless steel material.

The switch 6 can be used in many types, such as a touch screen switch, a voice switch, a slide switch or a button switch. The simple button switch 6 is used as an example, as shown in FIG. 3, a switch contact 61 are arranged on the control circuit board 2, and a button 63 is elastically supported on the switch contact 61 via a compression spring 62. After being pressed, the button 63 can be restored via the compression spring 62. The button 63 is pressed in place once, and the switch contact 61 will be triggered once accordingly.

In one specific embodiment, the wine decanter comprises a housing 1. As shown in FIG. 3, the housing 1 is assembled by the first housing 101 and the second housing 102 clamping each other. The housing 1 therein defines a tubular accommodation space 18, and the tubular accommodation space 18 therein contains an accommodation barrel suitable for the tubular accommodation space. Two ends in the accommodation space 18 for mounting the accommodation barrel 19 form a baffle ring 181 respectively so as to achieve upper and lower limits to prevent the accommodation barrel 19 from sliding inside the housing 1. Two opposite ends of the accommodation barrel 19 are through, and a plurality of slots (not shown) is formed inside the accommodation barrel 19. The plurality of slots comprises a first slot, a second slot, a third slot, and a fourth slot; the first slot is used to insert and fix both a control circuit board 2 and the gas-liquid mixing chamber 11 in the liquid flow path 105; the second slot is used to insert and fix the water pump 3; the third slot is used to insert and fix the air pump 4, and the fourth slot is used to insert and fix the charging circuit board 15. Multiple components are inserted and fixed in the accommodation barrel 19 to simplify the installation structure and installation process.

A side wall of the accommodation barrel 19 defines a first groove 191 for both the gas-liquid mixing chamber 11 and the switch 6 protruding through, and the housing 1 corresponding to the first groove 191 defines through holes 110, 60 for both the gas-liquid mixing chamber 11 and the switch 6 to extend out. The side wall of the accommodation barrel 19 further defines a second groove 192 for the charging interface 16 of the charging circuit board 15 protruding through, and the housing 1 corresponding to the second groove 192 defines another through hole 160 for the charging interface 16 to extend out. The indicator lamp and the switch 6 may also protrude through the first groove 191, and further protrude from other through holes defined in the housing 1 corresponding to the first groove 191. Preferably, the indicator lamp may not extend out of the housing 1, while the housing 1 at one end of the gas-liquid mixing chamber 11 integrally forms a transparent window 23, and the transparent window 23 corresponds to the location of the indicator lamp, and the transparent window 23 projects out of the housing 1 through the corresponding through hole 230.

Preferably, the control circuit board 2 defines more than one via holes 22. The second connecting pipe 8 of the water pump 3 and the gas pipe 9 of the air pump 4 pass through the via holes 22 and are connected to the gas-liquid mixing chamber 11 respectively, in such way to simplify the pipeline and beautify appearance. Preferably, the gas-liquid mixing chamber 11 forms two side tubes 111 for connecting to the second connecting pipe 8 and the gas pipe 9 respectively. The two side tubes 111 pass through the via holes 22 and are connected with the second connecting pipe 8 and the gas pipe 9 respectively. The side tubes 111 can also be used to fix the control circuit board.

A top of the accommodation barrel 19 is fitted with a cover plate 20 which can be fastened to the top of the accommodation barrel 19 by means of such as clamping connection to prevent the internal parts from disengaging from the top of the accommodation barrel 19. A mounting seat 21 with a cylindrical structure is disposed at a bottom of the accommodation barrel 19. The mounting seat 21 can be fastened to the bottom of the accommodation barrel 19 by means of such as clamping connection or thread connection to prevent the internal parts from disengaging from the bottom of the accommodation barrel 19. The cover plate 20 defines a notched slot 201 for the third connecting pipe 12 protruding through, the third connecting pipe 12 is used as wine discharge pipe and is connected to the gas-liquid mixing chamber 11 in the accommodation barrel 19. The third connecting pipe 12 inside may also be provided with elastic support mechanisms to support its inner wall. The other end of the third connecting pipe 12 extends out through a liquid discharge port 104 of the wine decanter. Specifically, the other end of the third connecting pipe 12 is inserted and connected to an outlet head 24, and the outlet head 24 is fixed by clamping inside the liquid discharge port 104. Referring FIGS. 3 and 5 together, the mounting seat 21 comprises a bottom plate 211 with a disc shape, and a circular side wall 212 extending towards both opposite sides from the rim of the bottom plate 211. A first connecting head 213 and a second connecting head 214 are respectively disposed at the two opposite faces of the bottom plate 211; both the first connecting head 213 and the second connecting head 214 are hollow and communicated with each other. The first connecting pipe 7 of the water pump 3 is inserted and connected to the first connecting head 213, and the second connecting head 214 is inserted and connected to the liquid intake pipe 17. The second connecting head 214 is usually disposed at the center of the bottom plate 211. The bottom plate 211 at one end of the second connecting head 214, the second connecting head 214, and the circular side wall 212 constitute a circular insertion seat 210 via which the wine decanter can be installed on the mouth of the wine bottle. The insertion seat 210 is usually arranged at a liquid intake port 103 of the housing 1. Preferably, a plurality of antiskid stripes evenly extends around an outer wall of the second connecting head 214 and along an axial direction of the second connecting head 214 to prevent from sliding and falling when the insertion seat 210 of the wine decanter is mounted on the mouth of the wine bottle.

The wine decanter of the present invention has the following advantages:

By setting the water pump 3 and the air pump 4, and connecting the gas pipe 9 of the air pump 4 to the liquid flow path 105 of the water pump 3, the red wine can be fully mixed with air before being discharged out of the wine decanter, so as to achieve a quick decanting and improve the drinking taste; moreover, it is convenient to clean the wine decanter.

Furthermore, by setting the magnetization mechanism 10 to the liquid flow path 105, the surface tension of red wine is increased; the red wine is softened, and thus tastes better.

Moreover, by setting a transparent gas-liquid mixing chamber 11 to the liquid flow path 105, and setting a light source at a corresponding position of the gas-liquid mixing chamber 11 to produce red lights, the red wine in the gas-liquid mixing chamber 11 can be irradiated by the light source, which can further accelerate decanting and improve the drinking taste.

The above are only embodiments of the invention, and are not therefore limited to the scope of the present invention; any equivalent structure or equivalent process changes may be made within the principles of the specification and the drawings of the invention; or their direct or indirect applications in other relevant technical fields, are all included in the scope of the present invention.

What is claimed is:

1. A wine decanter, comprising:
a control circuit board; and
a water pump, an air pump, a power supply and a switch electronically connected with the control circuit board respectively;
wherein a liquid flow path of the water pump comprises a first connecting pipe and a second connecting pipe; an inlet end of the water pump is connected to one end of the first connecting pipe, an outlet end of the water pump is connected to one end of the second connecting pipe; an outlet end of the air pump is connected to one end of a gas pipe, and the other end of the gas pipe is connected to any position of the liquid flow path;
the switch is capable of activating the water pump and the air pump; the water pump is capable of drawing red wine into the liquid flow path; the air pump is capable of inject air into the liquid flow path, and the liquid flow path is capable of mixing the red wine drawn by the water pump with the air injected by the air pump for decanting before the red wine is poured out.

2. The wine decanter of claim 1, wherein a gas-liquid mixing chamber is arranged in the liquid flow path; and the gas pipe is connected to the gas-liquid mixing chamber.

3. The wine decanter of claim 2, wherein the gas-liquid mixing chamber is transparent, a light source is integrated on the control circuit board to produce red light, the light source is disposed corresponding to the gas-liquid mixing chamber; the switch is capable of activating the light source; the light source produces red light to irradiate the gas-liquid mixing chamber to accelerate decanting the red wine flowing through the gas-liquid mixing chamber; the gas-liquid mixing chamber is used for flowing the red wine therethrough;
a light guide sheet is provided above the light source for uniformly transmitting light.

4. The wine decanter of claim 1, wherein the liquid flow path is provided with a magnetization mechanism; and the magnetization mechanism generates a magnetic field capable of magnetizing the red wine flowing through the liquid flow path.

5. The wine decanter of claim 4, wherein the magnetization mechanism comprises more than one ring magnets, and the ring magnets are sleeved and installed to the liquid flow path.

6. The wine decanter of claim 1, wherein the first connecting pipe, the second connecting pipe and the gas pipe all adopt flexible pipes; the first connecting pipe and/or the second connecting pipe and/or the gas pipe therein are provided with an elastic support mechanism for elastically supporting a pipe inner wall.

7. The wine decanter of claim 6, wherein the elastic support mechanism is spring.

8. The wine decanter of claim 3, wherein a charging circuit board is electronically connected with the control circuit board, and is integrated with a charging interface; and the power supply adopts a rechargeable battery which is electronically connected with the charging circuit board.

9. The wine decanter of claim 8, wherein the control circuit board is integrated with a power detection circuit, and the power detection circuit is electronically connected with the rechargeable battery; and
the control circuit board is integrated with an indicator lamp; the power detection circuit is capable of detecting a remaining electric quantity of the rechargeable battery, and the remaining electric quantity is displayed via the indicator lamp emitting different colors of light.

10. The wine decanter of claim 8, wherein the wine decanter comprises a housing which is assembled to one integral piece by a first case and a second case being clasped together; the control circuit board, the water pump, the air pump, the power supply, and the charging circuit board are contained in the housing; the switch and the charging interface of the charging circuit board extend out of the housing; the housing forms a liquid discharge port for pouring out the red wine and a liquid intake port for drawing the red wine; and two distal ends of the liquid flow path are located at the liquid discharge port and the liquid intake port respectively.

11. The wine decanter of claim 10, wherein the housing therein defines a tubular accommodation space, and the tubular accommodation space therein contains an accommodation barrel suitable for the tubular accommodation space; the accommodation barrel inside forms a plurality of slots respectively used to insert and fix the gas-liquid mixing chamber, the control circuit board, the water pump, the air pump, the power supply and the charging circuit board; a side wall of the accommodation barrel defines a first groove for both the gas-liquid mixing chamber and the switch protruding through, and the housing corresponding to the first groove defines through holes for both the gas-liquid mixing chamber and the switch to extend out; the side wall of the accommodation barrel further defines a second groove for the charging interface of the charging circuit board protruding through, and the housing corresponding to the second groove is provided with another through hole for the charging interface to extend out.

12. The wine decanter of claim 10, wherein a cover plate removably installs to a top of the accommodation barrel and a mounting seat removably installs to an opposite bottom of the same; the cover plate defines a notched slot for protruding a third connecting pipe connected with the gas-liquid mixing chamber; the mounting seat comprises a bottom plate, and a circular side wall extending towards both opposite sides from a rim of the bottom plate; two opposite faces of the bottom plate are provided with a first connecting head and a second connecting head respectively, the first connecting head and the second connecting head are hollow and connected to each other; the first connecting pipe of the water pump is inserted and connected to the first connecting head; the second connecting head is used to insert and connect a liquid intake pipe; the bottom plate at one end of the second connecting head, the second connecting head, and the circular side wall constitute a circular insertion seat via which the wine decanter is installed to a mouth of the wine bottle for drawing the red wine.

13. The wine decanter of claim 12, wherein a plurality of antiskid stripes extends around an outer wall of the second connecting head and along an axial direction of the second connecting head to prevent from sliding and falling when the insertion seat of the wine decanter is mounted on the mouth of the wine bottle.

14. The wine decanter of claim 12, wherein the liquid intake pipe is retractable, and the third connecting pipe inside is provided with an elastic support mechanism to support a pipe wall thereof.

15. The wine decanter of claim 12, wherein the control circuit board defines more than one via holes; the gas-liquid mixing chamber is provided with two side tubes; the side tubes pass through the via holes and are connected to the second connecting pipe and the gas pipe respectively.

* * * * *